United States Patent [19]
Ko

[11] Patent Number: 5,775,356
[45] Date of Patent: Jul. 7, 1998

[54] METHOD FOR ASSEMBLING THE CONTROL VALVE OF A SINGLE-HANDLE FAUCET

[75] Inventor: Hsi-Chia Ko, Changhua Hsien, Taiwan

[73] Assignee: Chung Cheng Faucet Co., Ltd., Hsien, Taiwan

[21] Appl. No.: 756,525

[22] Filed: Nov. 26, 1996

[51] Int. Cl.⁶ .......................... F16K 43/00; F16K 51/00
[52] U.S. Cl. .............. 137/15; 29/890.125; 29/890.131; 137/315
[58] Field of Search .............. 29/890.124, 890.125, 29/890.131, 402.12, 402.16; 137/15, 315, 625.41; 228/4.1, 6.1

[56] References Cited

U.S. PATENT DOCUMENTS

| | | | |
|---|---|---|---|
| 3,777,342 | 12/1973 | Allen | 29/890.131 |
| 3,823,742 | 7/1974 | Von Corpon | 137/625.41 |
| 4,043,359 | 8/1977 | Christo | 137/625.41 |
| 4,108,208 | 8/1978 | Von Cropon | 137/625.41 |
| 4,150,810 | 4/1979 | Laignel et al. | 29/890.125 |
| 4,484,596 | 11/1984 | Hikade et al. | 137/315 |
| 4,801,125 | 1/1989 | Kocher | 29/890.125 |

Primary Examiner—George L. Walton
Attorney, Agent, or Firm—Bacon & Thomas

[57] ABSTRACT

Alignment between a valve stem and the water outlet of a control valve for a single-handle faucet is maintained by fitting a threaded end of the stem within a hole in an upper semispherical housing of the valve and securing the stem to the housing with a screw having a head section that is welded to an inner wall of the housing.

1 Claim, 4 Drawing Sheets

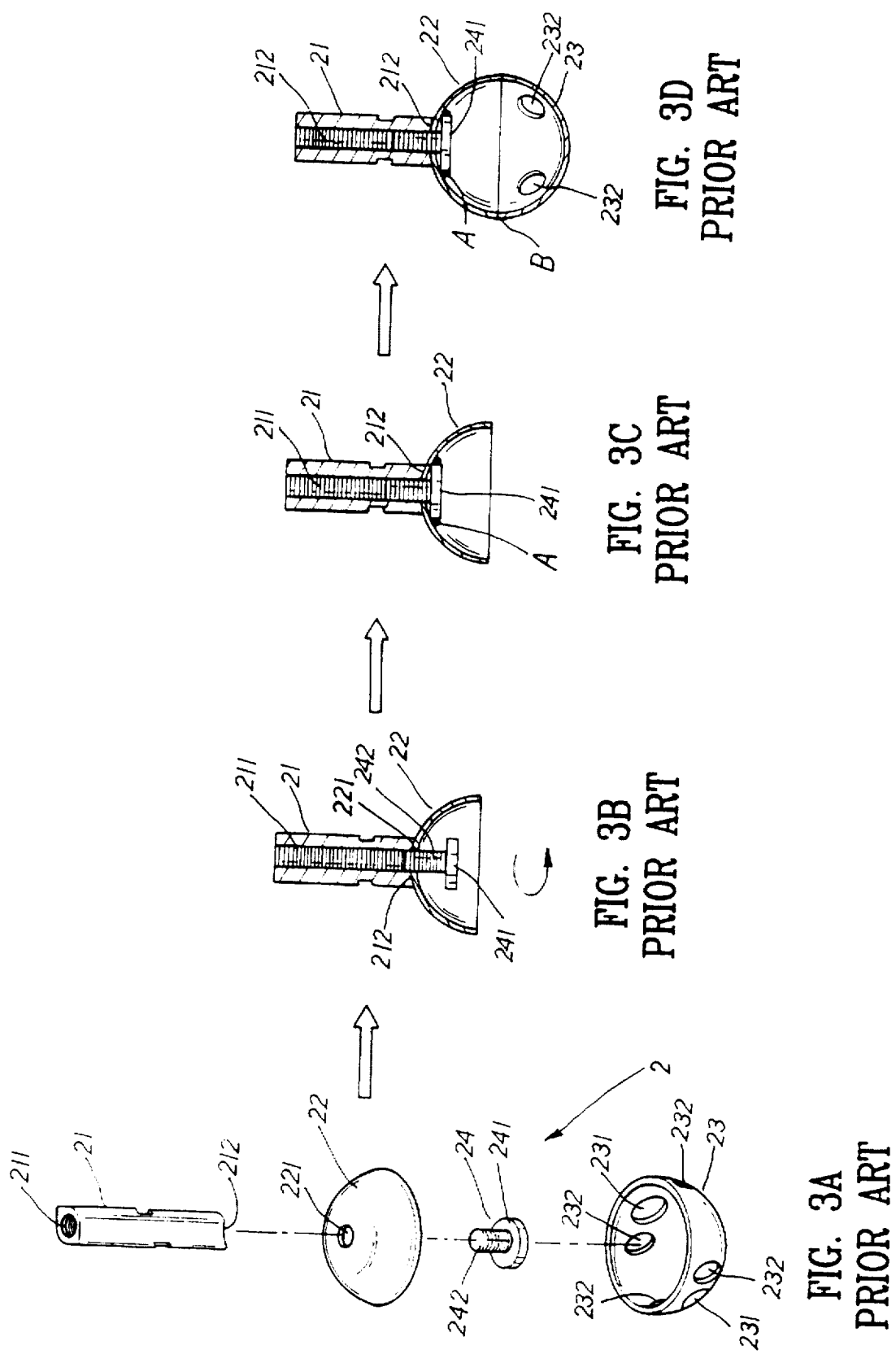

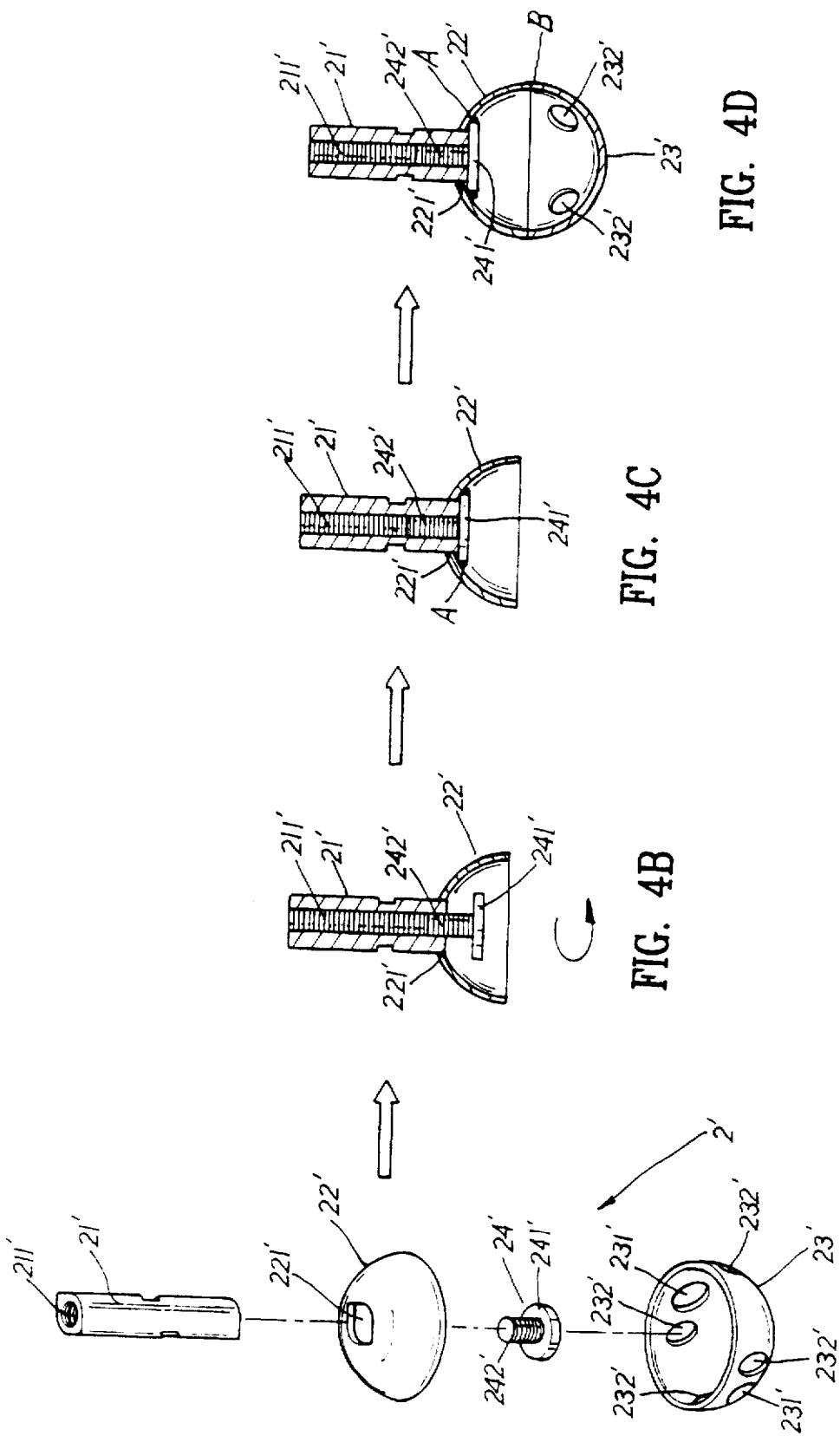

METHOD FOR ASSEMBLING THE CONTROL VALVE OF A SINGLE-HANDLE FAUCET

BACKGROUND OF THE INVENTION

The present invention relates to a method for assembling the control valve of a single-handle faucet, in which the bottom end of the valve stem is no longer required to be processed into a concave face so that no sophisticated processing techniques are needed. The valve stem is fitted into an engaging hole is an upper housing so that the valve stem is accurately located against rotation. Also, the valve stem is firmly associated with the upper housing by means of both the engaging hole and a screw, whereby the valve stem is prevented from loosening or detaching from the upper housing and the handle can accurately the incoming/outgoing of the water.

FIGS. 1 and 2 show a conventional single-handle faucet which includes a main body 1, a control valve 2, a washer 3, a fastening pad 4, a fastening cover 5, a handle 6, a bolt 7 and a decorative cap 8. When assembled, the control valve 2 is first fitted into the socket at the top end of the main body 1 in alignment with the water inlet and water outlet. Then the washer 3 is placed on the spherical surface of the control valve 2 with its outer peripheral wall engaged with the inner peripheral wall of the socket of the main body 1. Then the fastening pad 4 is fitted on the washer 3 and depressed downward, making the outer peripheral wall to be engaged with the inner peripheral wall of the socket. The valve stem of the control valve 2 is located in a rectangular slot of the top end of the pad member. Then the fastening cover 5 is screwed with the upper column of the main body 1 and the valve stem of the control valve 2 is fitted into a fitting hole of the handle 6. Then the bolt 7 is passed through the stepped hole of the top face of the handle 6 and screwed into the threaded hole of the top end of the valve stem. Then the decorative cap 8 is fitted into the large diameter section of the stepped hole of the handle 6 to complete the assembly.

When not used, the handle 6 is moved forward to the end so as to shut off the water flow. In use, the handle 6 is moved backward. The more the handle is moved backward, the larger the amount of the discharged water. Also, the more the handle 6 is clockwise rotated, the larger the amount of the discharged cold water is and the less the amount of the discharged hot water. Reversely, the more the handle 6 is counterclockwise rotated, the larger the amount of the discharged hot water and the less the amount of the discharged cold water.

FIG. 3 shows the processing and assembling procedure of the conventional control valve 2 which includes a valve stem 21, an upper semispherical housing 22, a lower semispherical housing 23 and a screw 24. The top end of the valve stem 21 is formed with a threaded through hole 211. The bottom end of the valve stem 21 is cut into a concave face 212 by a sophisticated machining technique. The top end of the upper housing 22 is disposed with a circular hole 221. The lower housing 23 is disposed with two opposite water outlets 231. Each side of each water outlet 231 is disposed with a small diameter water inlet 239. The screw 24 includes a head section 241 and a threaded stem 242.

When processed and assembled, the concave bottom face 212 of the valve stem 21 is painted with adhesive agent and the concave bottom face 212 is attached to the periphery of the circular hole 221 of the upper housing 22 in alignment with the standard line by visual observation. Then the stem 242 of the screw 24 is passed upward passed through the circular hole 221 and screwed into a lower section of the threaded through hole 211 of the valve stem 21 with the head section 241 abutting against the inner wall of the top end of the upper housing 22. Then the periphery of the head section 241 is welded with the inner wall of the top end of the upper housing 22. Then the upper edge of the lower housing 23 is welded with the lower edge of the upper housing 22 to complete the processing and assembling procedure.

According to the above procedure, because the upper and lower housings 22, 23 and the screw 24 are all made of stainless steel material, they are not subject to rusting and can be connected with each other by welding. However, the valve stem 21 needs to be fitted into the identically shaped fitting hole of the handle 6 without relative rotation, so that the valve stem 21 cannot be made of stainless steel material. In general, the valve stem is made of molded copper material, which has a hardness less than that of iron material and is not subject to rusting. Therefore, the valve stem cannot be directly welded with the upper housing 22 and an adhesive agent is necessary for attaching the valve stem to the upper housing 22. Accordingly, several disadvantages exist in this arrangement as follows:

1. The bottom end of the valve stem 21 must be processed into a concave face 212 for snugly engaging with the top end of the upper housing 22. Therefore, it is necessary to process the valve stem by a sophisticated processing technique. Such high level processing technique tends to form defective products.

2. After the stem 242 of the screw 24 is screwed into the threaded hole 21 of the valve stem 21, the standard line of the valve stem 21 should be aligned with the water outlet 231 of the lower housing 23 and also aligned with the fitting hole of the handle 6. Otherwise, when operating the handle 6, the opening/closing operation cannot be accurately performed. Moreover, the water outlet 231 and water inlet 232 of the lower housing 23 cannot be aligned with the water inlet and water outlet of the main body 1. The concave bottom face 212 of the valve stem 21 is painted with an adhesive agent and the concave bottom face 212 is attached to the periphery of the circular hole 221 of the upper housing 22 in alignment with the standard line by visual observation. Such manner of assembly often leads to error. Moreover, prior to drying of the adhesive agent, the stem 242 of the screw 24 is immediately screwed upward into the threaded hole 211 of the valve stem 21, so that during the screwing operation, the valve stem 21 is apt to displace and the standard line thereof will be misaligned from the water outlet 231 of the lower housing 23 and the fitting hole of the handle 6.

3. In the case of defective concave face 212 of the valve stem 21, after the concave face 212 is painted with the adhesive agent, it will be difficult to snugly engage the valve stem with the upper housing 22. Moreover, after the valve stem 21 is assembled with the handle 6, during operation, under the applied force of the handle 6 and the shock due to collision against the fastening pad 4, the concave face 212 of the valve stem 21 is very apt to loosen or even detach from the upper housing 22. As a result, a clearance is defined between the valve stem 21 and the upper housing 22 so that the handle 6 will swing during operation.

SUMMARY OF THE INVENTION

It is a primary object of the present invention to provide a method of assembling the control valve of single-handle faucet. The control valve includes a valve stem, an upper semispherical housing, a lower semispherical housing and a screw. A top end of the valve stem is disposed with a threaded through hole. A top end of the upper housing is disposed with an engaging hole. By means of the above arrangement, the bottom end of the valve stem is no longer required to be processed into a concave face for snugly engaging with the top end of the upper housing. Therefore, the ratio of defective products is reduced and no sophisticated processing technique is needed so that the processing procedure is simplified and economical.

It is a further object of the present invention to provide the above manner in which the valve stem is fitted into the engaging hole of the upper housing so that the valve stem is restricted from displacing and accurately located without rotation. Therefore, it is ensured that, when assembled, the standard line will not be deflected and will remain aligned with the water outlet of the lower housing and the fitting hole of the handle. As a result, the handle can accurately control the incoming/outgoing of the water.

It is still a further object of the present invention to provide the above method in which the valve stem is firmly associated with the upper housing by means of both the engaging hole and the screw. Therefore, when operating the handle, under the applied force of the handle and the shock due to collision against the fastening pad, the valve stem is prevented from loosening or detaching from the upper housing.

The present invention can be best understood through the following description and accompanying drawings, wherein:

BRIEF DESCRIPTION OF THE DRAWINGS

FIG. 3A is a perspective exploded view of the conventional control valve;

FIGS. 3B to 3D show the method steps for and assembling the conventional control valve;

FIG. 4A is a perspective exploded view of the control valve according to the present invention; and FIGS. 4B to 4D show the method steps for assembling the control valve according to the present invention.

DETAILED DESCRIPTION OF THE PREFERRED EMBODIMENT

Figure 1:
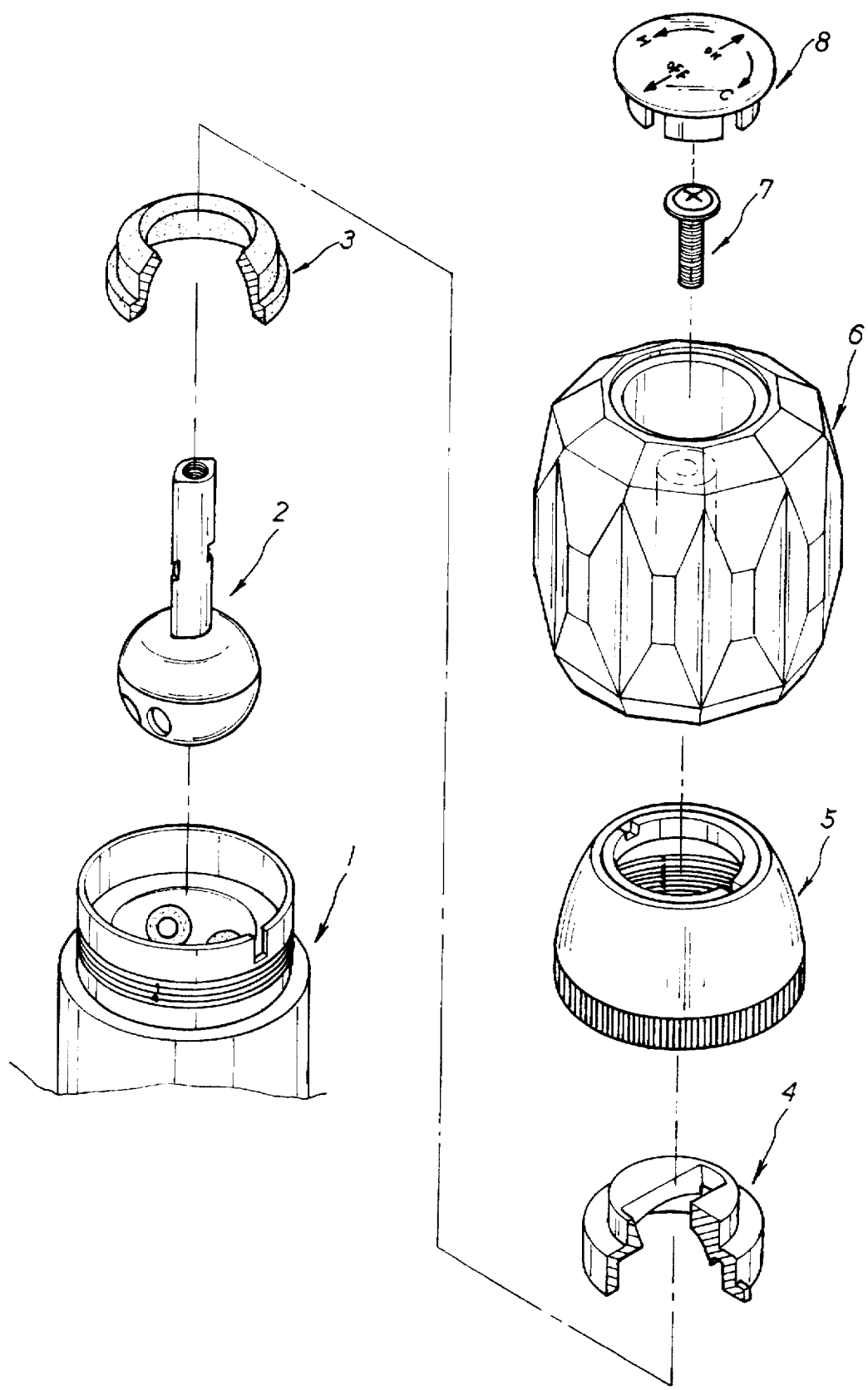
FIG. 1 is a perspective exploded view of a conventional single-handle faucet.
Figure 2:
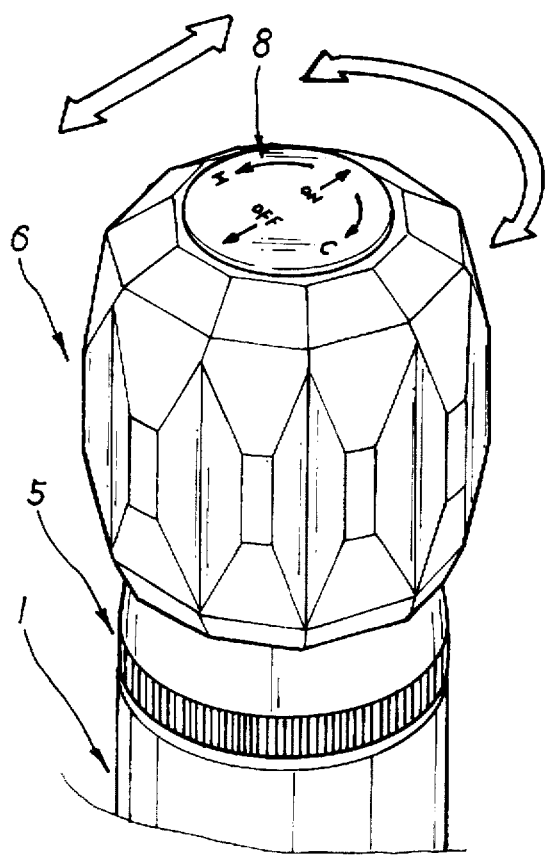
FIG. 2 is a perspective assembled view according to FIG. 1, showing the operation of the conventional single-handle faucet.

Please refer to FIG. 4. The control valve 2' of the present invention includes a valve stem 21', an upper semispherical housing 22', a lower semispherical housing 23' and a screw 24'. The top end of the valve stem 21' is disposed with a threaded through hole 211'. The cross-section of the valve stem 21' can be of any shape except circular shape. The top end of the upper housing 22' is disposed with an engaging hole 221' ( having a cross-sectional shape identical to that of the valve stem 21 ). The surface of the lower housing 23' is disposed with two opposite water outlets 231'. Each side of each water outlet 231' is disposed with a small diameter water inlet 232'. The screw 24' includes a head section 241' and a threaded stem 242'.

When assembling , a lower end section of the valve stem 21' is fitted into the engaging hole 221' of the upper housing 22', whereby the valve stem 21' is restricted from rotation and located in alignment with the standard line. Then the stem 242' of the screw 24' is screwed upward into a lower section of the thread through hole 211' of the valve stem 21 with the head section 241' abutting against the inner wall of the top end of the upper housing 22', whereby the valve stem 21' is prevented from detaching from the upper housing 22'. Then the periphery of the head section 241' is welded to with the inner wall of the top end of the upper housing 22' as indicated at A. Then the upper edge of the lower housing 23' is welded with the lower edge of the upper housing 22' as indicated at B to complete the assembling procedure.

According to the above arrangement, the present invention has the following advantages:

1. The bottom end of the valve stem 21' is no more required to be processed into a concave face for snugly engaging with the top end of the upper housing 22'. Therefore, since the sophisticated processing technique is unnecessary, so that the ratio of defective products is reduced. Moreover, the assembling procedure is simplified requirement economical requirement.

2. After the valve stem 21' is fitted into the engaging hole 221' of the upper housing 22', the valve stem. 21' is restricted from displacing and accurately located without rotation, whereby it is ensured that when assembled, the standard line will not be deflected and will remain aligned with the water outlet 231' of the lower housing 23' and the fitting hole of the handle 6. Therefore, the handle 6 can accurately control the incoming/outgoing of the water. 3. The valve stein 21' is firmly associated with the upper housing 22' by means of both the engaging hole 221' and the screw 24'. Therefore, when operating the handle 6, under the applied force of the handle 6 and the shock due to collision against the fastening pad 4, the valve stem 21' is prevented from loosening or detaching from the upper housing 22'.

The above embodiment is only an example of the present invention and the scope of the present invention should not be limited to the example. Any modification or variation derived from the example should fall within the scope of the appended claims.

What is claimed is:

1. A method of assembling a control valve for a single-handle faucet wherein the control valve includes an upper semispherical housing having an inner wall, an engaging hole formed in a top end thereof and a lower peripheral edge, a lower semispherical housing having an upper peripheral edge, a water inlet and a water outlet, a valve stem having a threaded hole formed in a lower end thereof, and a screw including a threaded stem and a head section, the method comprising the steps of:

a) fitting the lower end of the valve stem into the engaging hole of the upper semispherical housing;

b) screwing the threaded stem of the screw into the threaded hole of the valve stem until the head section of the screw abuts against the inner wall of the upper semispherical housing;

c) welding the head section of the screw to the inner wall of the upper semispherical housing to prevent detachment of the valve stem from the housing and maintaining its alignment with respect thereto; and d) welding the lower peripheral edge of the upper semispherical housing to the upper peripheral edge of the lower semispherical housing, whereby the standard line of the valve stem will remain in alignment with the water outlet of the lower housing for accurately controlling water flow through the faucet.

* * * * *